United States Patent
Kim (10) Patent No.: US 7,596,705 B2
(45) Date of Patent: Sep. 29, 2009

(54) AUTOMATICALLY CONTROLLING PROCESSOR MODE OF MULTI-CORE PROCESSOR

(75) Inventor: Seo Kwang Kim, Suwon (KR)

(73) Assignee: LG Electronics Inc., Seoul (KR)

( * ) Notice: Subject to any disclaimer, the term of this patent is extended or adjusted under 35 U.S.C. 154(b) by 498 days.

(21) Appl. No.: 11/424,080

(22) Filed: Jun. 14, 2006

(65) Prior Publication Data
US 2006/0288243 A1 Dec. 21, 2006

(30) Foreign Application Priority Data
Jun. 16, 2005 (KR) ............. 10-2005-0052066

(51) Int. Cl.
G06F 1/00 (2006.01)
G06F 1/26 (2006.01)
G06F 1/32 (2006.01)
G06F 15/16 (2006.01)

(52) U.S. Cl. .......... 713/300; 713/320; 713/324; 712/28

(58) Field of Classification Search ........ 713/300, 713/320, 324
See application file for complete search history.

(56) References Cited

U.S. PATENT DOCUMENTS

| | | | | |
|---|---|---|---|---|
| 5,339,445 A * | 8/1994 | Gasztonyi | ............ | 713/324 |
| 5,737,615 A * | 4/1998 | Tetrick | ............ | 713/324 |
| 5,905,914 A * | 5/1999 | Sakai et al. | ............ | 710/67 |
| 6,631,474 B1 | 10/2003 | Cai | | |
| 6,865,653 B2 * | 3/2005 | Zaccarin et al. | ............ | 711/154 |
| 6,865,684 B2 * | 3/2005 | Atkinson | ............ | 713/323 |
| 2001/0047490 A1 | 11/2001 | Barbee | | |
| 2002/0152408 A1 * | 10/2002 | Inui et al. | ............ | 713/300 |
| 2003/0110012 A1 * | 6/2003 | Orenstien et al. | ............ | 702/188 |
| 2003/0135771 A1 * | 7/2003 | Cupps et al. | ............ | 713/320 |
| 2004/0215987 A1 | 10/2004 | Farkas | | |
| 2005/0050310 A1 | 3/2005 | Bailey | | |
| 2005/0050373 A1 | 3/2005 | Orenstien | | |
| 2005/0154931 A1 * | 7/2005 | Oh | ............ | 713/300 |
| 2005/0188189 A1 * | 8/2005 | Yeung et al. | ............ | 713/1 |

FOREIGN PATENT DOCUMENTS

| | | |
|---|---|---|
| GB | 2 373 887 | 10/2002 |
| KR | 2005-0073976 | 7/2005 |
| KR | 2005-0073977 | 7/2005 |

OTHER PUBLICATIONS

European Search Report dated Nov. 6, 2006, Application No. 06012047.4, (11 pages).
Grochowski E. et al.; "Best of Both Latency and Throughput"; Proceedings of the IEEE International Conference on Computer Design (ICCD '04); 8 pages.

* cited by examiner

*Primary Examiner*—Thomas Lee
*Assistant Examiner*—Ji H Bae
(74) *Attorney, Agent, or Firm*—Fish & Richardson P.C.

(57) ABSTRACT

An apparatus for controlling a power management mode of a multi-core processor in a computer system includes a monitoring unit configured for monitoring conditions relating to the power management mode of the multi-core processor. The apparatus also includes an automatic mode change unit operatively connected to the monitoring unit for receiving the monitored conditions. The automatic mode change unit is configured to set the power management mode of the multi-core processor to a single-core mode or a multi-core mode based on the monitored conditions.

16 Claims, 5 Drawing Sheets

AUTOMATICALLY CONTROLLING PROCESSOR MODE OF MULTI-CORE PROCESSOR

BACKGROUND

This description relates to automatically controlling a processor mode of a multi-core processor according to the operating state of a system.

A conventional portable computer system having a multi-core processor includes a processor (CPU) containing cores, a video controller, a main memory, a north bridge for controlling the main memory, an input/output (I/O) controller, a south bridge which is a collection of registers which manage an input/output function of peripheral devices, a hard disk drive (HDD), a keyboard controller, and a power controller. The power controller is connected to the operating system of the computer system, the processor (CPU), and a core chipset, so as to control the power supplied to each core.

The conventional computer system, which uses a processor containing two or more cores, supports a single-core mode to operate only one of the cores and a multi-core mode to operate all of the cores in relation to the power management mode of the processor. The multi-core processor typically consumes greater power than a single-core processor performing the same system operations. The power consumption reduces the available operating time of a battery, such as in a portable computer.

In the conventional computer system having a multi-core processor, power management is performed by either setting a single-core mode or a multi-core mode in the complementary metal oxide semiconductor (CMOS) setup of the system. Once the power management mode of a processor is set, the system is restarted in order to change the setup state and power management mode of the processor.

SUMMARY

In one general aspect, an apparatus for controlling a power management mode of a multi-core processor in a computer system includes a monitoring unit configured to monitor conditions relating to the power management mode of the multi-core processor. The apparatus also includes an automatic mode change unit operatively connected to the monitoring unit for receiving the monitoring conditions. The automatic mode change unit is configured to set the power management mode of the multi-core processor to a single-core mode or a multi-core mode based on the monitored conditions.

Implementations may include one or more of the following features. For example, the monitored conditions may include at least one condition selected from the group consisting of the power mode of the computer system, an AC power status, a remaining battery level, available memory, and memory usage. The monitored conditions also may include an activity relating to an operation of an application program.

The automatic mode change unit may be configured to set the power management mode to the single-core mode for a power saving mode, and to set the power management mode to the multi-core mode for a full performance mode.

The automatic mode change unit may be configured to set a power management mode to the single-core mode if an AC power status of the computer system is in a battery mode, and may be configured to set the power management mode to the multi-core mode if the AC power status of the computer system is in an AC adapter mode.

The automatic mode change unit may be configured to set the power management mode to the single-core mode if a remaining power of a battery is equal to or less than a predetermined threshold value, and to set the power management mode to the multi-core mode when the remaining power of the battery exceeds the predetermined threshold value.

The automatic mode change unit may be configured to set the power management mode to the single-core mode if an amount of memory usage is equal to or less than a predetermined threshold value, and to set the power management mode to the multi-core mode if the amount of memory usage exceeds the predetermined threshold value.

The automatic mode change unit may be configured to set the power management mode based upon a detection of an activity relating to an application program, wherein the application program and a corresponding power management mode are registered in a memory device.

The automatic mode change unit may be configured to set the power management mode based upon an additional monitored condition if the power mode is in an automatic mode. The additional monitored condition includes at least one condition selected from the group consisting of an AC power status, a remaining battery level, memory usage, available memory, and an activity relating to an operation of an application program.

In another general aspect, a computer system includes a multi-core processor, an operating system, and a power management mode control apparatus operatively connected to the operating system and the multi-core processor. The power management mode control apparatus is configured to control a power management mode of the multi-core processor. The power management mode control apparatus includes a monitoring unit configured to monitor conditions relating to the power management mode of the multi-core processor, and an automatic mode change unit operatively connected to the monitoring unit for receiving the monitored conditions. The automatic mode change unit is configured to set the power management mode of the multi-core processor to a single-core mode or a multi-core mode based on the monitored conditions.

In another general aspect, controlling a power management mode of a multi-core processor includes monitoring conditions relating to the power management mode of the multi-core processor, and setting the power management mode to a single-core mode or a multi-core mode based upon the monitored conditions.

Implementations may include one or more of the following features. For example, the monitored conditions may include at least one condition selected from the group consisting of the power mode of the computer system, an AC power status, a remaining battery level, available memory, and memory usage.

The monitored conditions may include an activity relating to an operation of an application program.

In another general aspect, a computer-readable recording medium stores a computer-executable program code therein to cause a computer to control a power management mode of a multi-core processor. The code causes the computer to monitor conditions relating to the power management mode of the multi-core processor, and to set the power management mode to a single-core mode or a multi-core mode based upon the monitored conditions.

Implementations may include one or more of the following features. For example, the monitored conditions may include at least one condition selected from the group consisting of the power mode of the computer system, an AC power status, a remaining battery level, available memory, and memory usage. The monitored conditions also may include an activity relating to an operation of an application program.

Other features will be apparent from the following description, including the drawings, and the claims.

DETAILED DESCRIPTION

In the following description and drawings, the same reference numerals are used to designate the same or similar components, so a description of the same or similar components will not be repeated.

Figure 1:
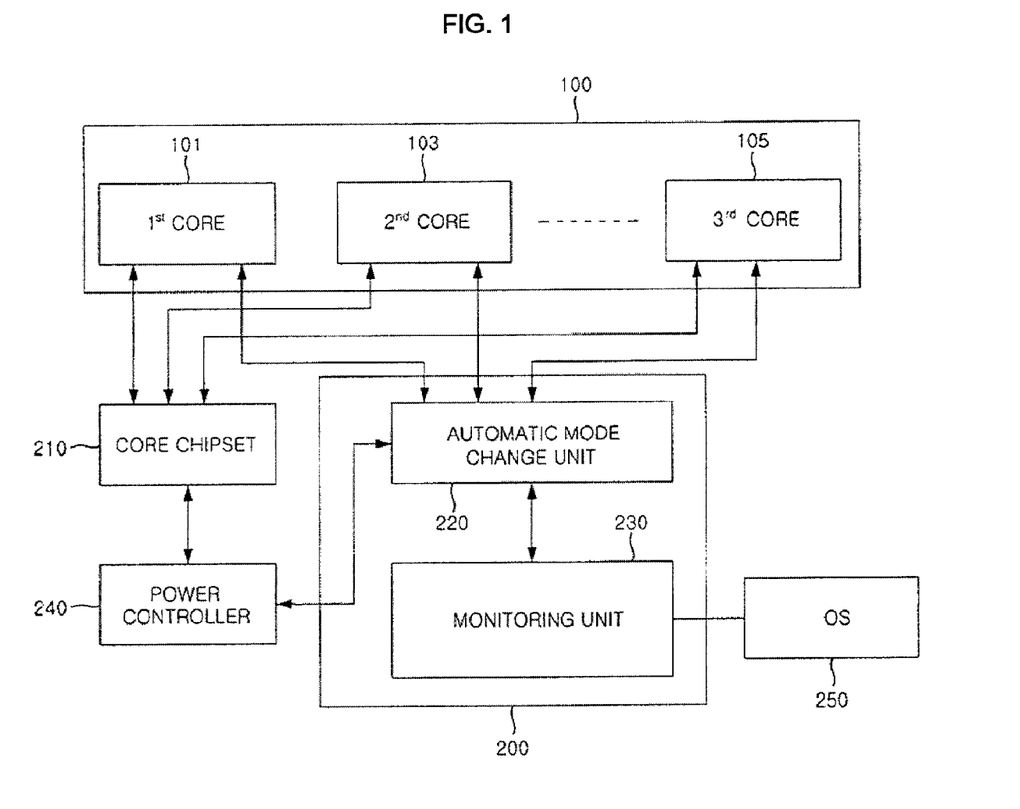
FIG. 1 is a block diagram of an automatic power-mode control apparatus for a multi-core processor.

Referring to FIG. 1, a portable computer system that employs an automatic power-mode control apparatus for a multi-core processor includes a processor 100 containing at least two cores and an automatic power-mode control apparatus 200. The automatic power-mode control apparatus 200 includes a monitoring unit 230 and an automatic mode change unit 220. The portable computer system also includes a core chipset 210. The core chipset 210 connects the processor 100, which controls the entire operation of the portable computer system, to peripheral devices of the processor 100 and supports the processor 100, so as to control a memory device and input and output devices. The portable computer system may include one or more of a video controller (not shown), a main memory (not shown), an input/output (I/O) controller (not shown), a hard disk drive (HDD) (not shown), a keyboard controller (not shown), and/or a power control unit 240.

The hard disk drive stores various programs including an operating system (OS). A system program such as the OS and various application programs may be stored in a separate memory, such as ROM. Meanwhile, the operating system stored in the hard disk drive is uploaded to a RAM in the memory during or in response to a system booting operation.

The power control unit 240 is connected to the operating system of the computer system, the processor 100, and the core chipset 210, so as to control power supplied to each core depending on a processor mode.

The monitoring unit 230 monitors conditions relating to the power management mode of the multi-core processor. Although monitoring conditions of the monitoring unit 230 may include a number of system and peripheral component parameters, exemplary monitored conditions include one or more of the power mode of the computer system, the AC power status of the computer system, the remaining power of an associated battery, the amount of available memory (or memory used), an operation associated with an application program, or the recognition of a type of application program.

The monitoring unit 230 receives information about the power mode of the processor from the operating system 250 of the computer system. Generally, the power mode of the processor 100 includes four mode types: a maximum performance mode, an automatic mode, an optimum battery mode, and a maximum power saving mode. However, the number and type of power management modes may be varied depending on the computer manufacturer or configuration.

The multi-core processor can be controlled to operate either in a single-core mode or in a multi-core mode based on the power mode of the processor. The power mode of the processor may be defined, for example, as follows:

1. Maximum Performance Mode. In this mode, the processor operates at its maximum performance and does not use a power saving function. Instead, the processor employs 100% usage of all CPU cores.

2. Automatic Mode. In this mode, the processor uses the power saving function to a higher degree than that used in the maximum performance mode. For example, the processor may employ 70% usage of the CPU cores.

3. Optimum Battery Mode. In this mode, the processor uses the power saving function to a higher degree than that used in the automatic mode. For example, the processor may employ 50% usage of the CPU cores.

4. Maximum Power Saving Mode. In this mode, the processor operates to obtain the maximum power saving effect and hardly consumes any battery charge. For example, the processor may make 20% usage of the CPU cores.

The power mode of the processor may either be automatically managed by a power management program of the computer system, or may be manually operated by the user. For example, when the user uses a notebook computer without an AC power source connected to the notebook computer, the power saving mode, such as the optimum battery mode or the maximum battery mode, is automatically selected in order to increase the operating time of the battery. If it is desired to manually alter the power saving mode, a user can adjust the power mode or the settings of the power mode through the system hardware, for example, with the power option of the OS control panel. If the user manually changes the power mode of the processor, a control unit receives the current power mode as an operating system event, and automatically controls the processor mode.

If performance is a primary consideration, the automatic mode change unit 220 of the automatic power-mode control apparatus sets the processor mode to a multi-core mode when the power mode of the processor is either the maximum performance mode or the automatic mode. In contrast, if the preservation of battery power is a primary consideration, the automatic mode change unit 220 sets the processor mode to a single-core mode, such as the optimum battery mode or the maximum power saving mode.

The monitoring unit 230 continuously checks if AC power is applied from an external power source, the remaining power of the battery, the amount of available memory, an operation associated with an application program, and/or for the recognition of a type of application program. The results from the monitoring unit 230 are transmitted to the automatic mode change unit 220.

The automatic mode change unit 220 receives data relating to conditions for mode determination from the monitoring unit 230. The automatic mode change unit 220 selects and sets a single-core mode or a multi-core mode as the power mode of the system according to the condition information received from the monitoring unit 230. If it is necessary to consider various conditions relating to the system state at the same time, each condition for power mode setup is stored in the memory (not shown) of the computer system in connection with each corresponding optimum power mode. The remaining battery power may be classified into a high level (relatively high charge), a middle level (relatively medial charge), and a low level (relatively little charge). For example, the remaining battery power may be classified into a low level for a remaining battery power of less than approximately 30%, a middle level for a remaining battery power of 30% to 50%, and a high level for a remaining battery power of 50% or more.

If a multi-core processor includes three cores, the processor mode is set to mode #1 so at to operate only one core when the remaining power of the battery is less than 30%, is set to mode #2 so as to operate two cores when the remaining power of the battery is 30% to 50%, and is set to mode #3 so as to operate all three cores when the remaining power of the battery is equal to or greater than 50%. The threshold values for the remaining power of the battery and the associated range that are used for changing the operation mode are stored in the memory of the computer system and in connection with a corresponding processor mode.

The monitoring unit 230 of the automatic power-mode control apparatus 200 acquires information relating to one or more of the following from the operating system 250 of the computer system: information relating to the AC power status (such as operation in an adapter mode or a battery mode), the remaining battery power, the amount of available memory, an operation associated with a specific application program (such as a registered program being executed), and/or information relating to a type of application program being operated or present.

The automatic mode change unit 220 selects a processor mode based on data relating to conditions for determining a power management mode which has been received from the monitoring unit 230. The automatic mode change unit 220 controls the power supplied to each core based on the selected processor mode and through the power control unit 240 connected to each core.

Figure 2:
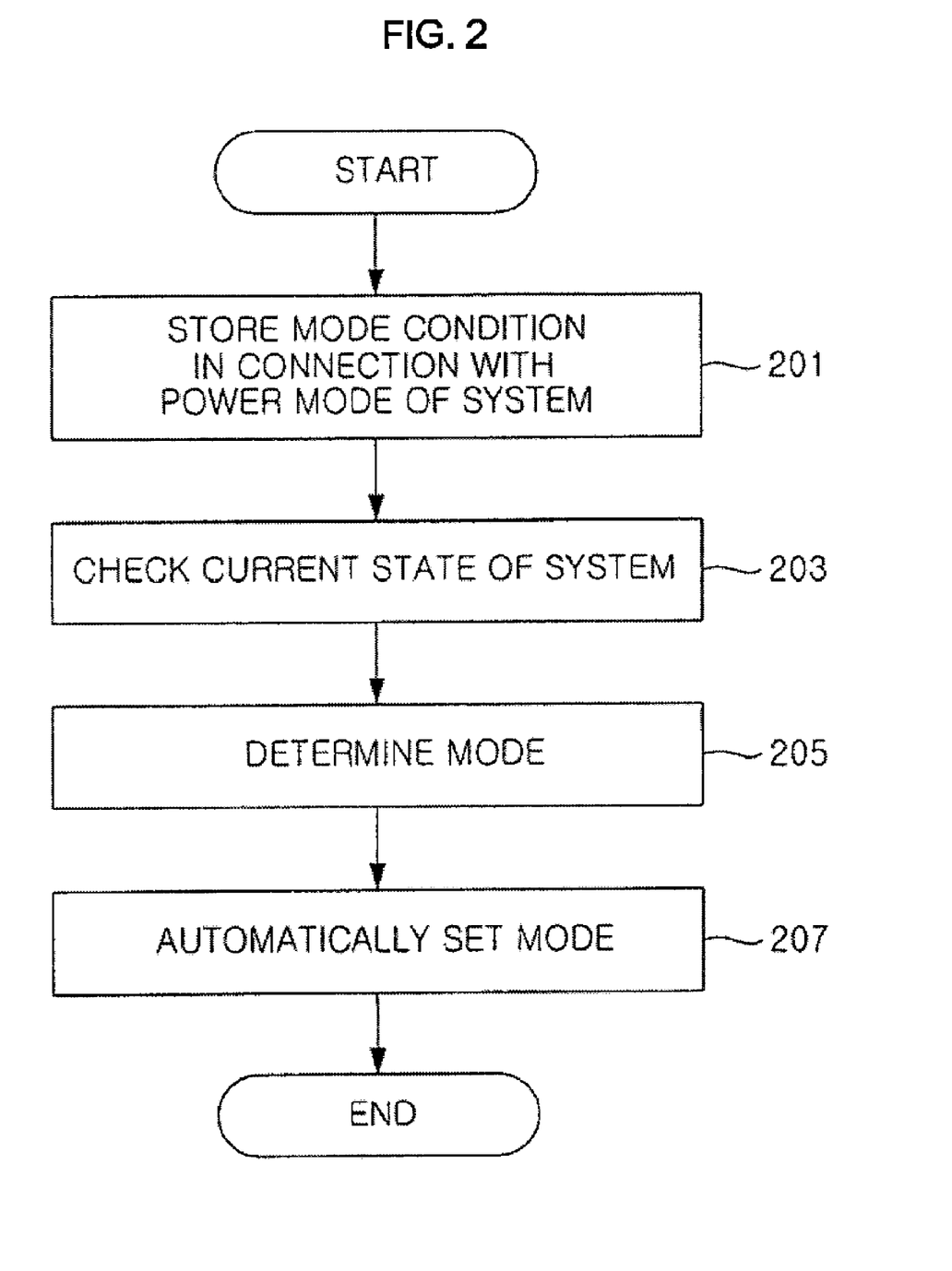
FIG. 2 is a flowchart of an automatic power-mode control process for a multi-core processor.

Referring to FIG. 2, in order to automatically control the power mode of the multi-core processor, the current state of a system including a multi-core processor is continuously monitored (203). The power mode of the system, an AC power status, the remaining battery power, the amount of available memory, application program type or operations, and/or other system conditions may be monitored.

Depending on the conditions obtained through the monitoring, either a multi-core mode or a single-core mode is selected (205). The interrelationship between monitored conditions and modes is stored in a memory device, such as a look-up table in an internal or external memory device, so as to determine a mode suitable to each condition (201). In addition, a processor mode is determined based on threshold values stored in the memory (205). If a processor mode is determined depending on the conditions of the system, the power mode is automatically changed to the determined mode. Since the system does not need to be restarted, the processor mode of the system can be automatically changed in real time according to the conditions of the system.

Figure 3:
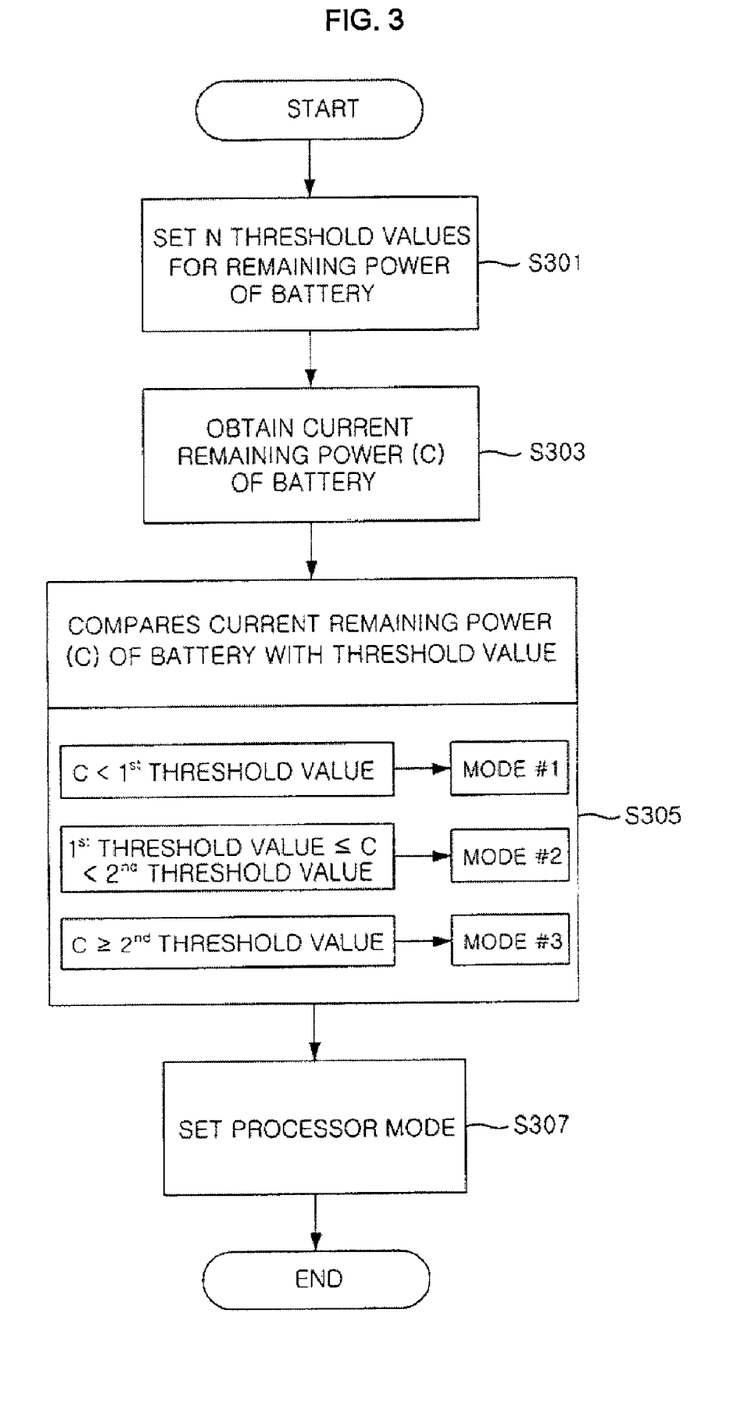
FIG. 3 is a flowchart of an automatic power-mode control process for a multi-core processor based on the remaining power of a battery.

Referring to FIG. 3, a multi-core processor including three cores is managed according to three ranges of battery power. First, threshold values for the remaining power of battery are set in order to control the processor mode of the multi-core processor based on the remaining power of battery (301). These threshold values may be changed depending on computer system, and may be set to different values by the user. When the multi-core processor includes N cores, N−1 threshold values will generally be set. For instance, when the multi-core processor includes three cores, three modes and battery power ranges are based on the number of operated cores, so two threshold values, a first threshold value and a larger second threshold value are set.

For example, the first threshold value may be set at a remaining battery power of 30%, and the second threshold value may be set at a remaining battery power of 50%. Therefore, in the case of the multi-core processor including three cores, the processor mode may be set to mode #1 so as to operate only one core when the remaining power of battery is less than 30%, set to mode #2 so as to operate two cores when the remaining power of battery is 30% to 50%, and set to mode #3 so as to operate all the three cores when the remaining power of battery is equal to or greater than 50%.

To accomplish this, the remaining power of the battery for the system is obtained (303). Information about the remaining power of the battery may be obtained from the operating system (OS) of the computer system.

After the remaining power of the battery has been obtained, the current remaining power (C) of the battery is compared with the first threshold value "$TH_{low}$" and the second threshold value "$TH_{high}$" to determine the processor mode (305). First, the current remaining power (C) of the battery is compared with the first threshold value "$TH_{low}$". If the current remaining power (C) of the battery is less than the first threshold value "$TH_{low}$", the processor mode is set to mode #1. In contrast, if the current remaining power (C) of the battery is equal to or larger than the first threshold value "$TH_{low}$", and less than the second threshold value "$TH_{high}$", the processor mode is set to mode #2. If the current remaining power (C) of the battery is equal to or greater than the second threshold value "$TH_{high}$", the processor mode is set to mode #3.

After the processor mode has been set, the existing mode and the set mode are compared to each other to determine if the system is operating as desired. If it is determined that the two modes are equal to each other, the procedure returns to step 303. In contrast, if it is determined that the two modes differ from each other, the procedure proceeds to step 307 in which the existing mode is replaced with the set mode.

Figure 4:
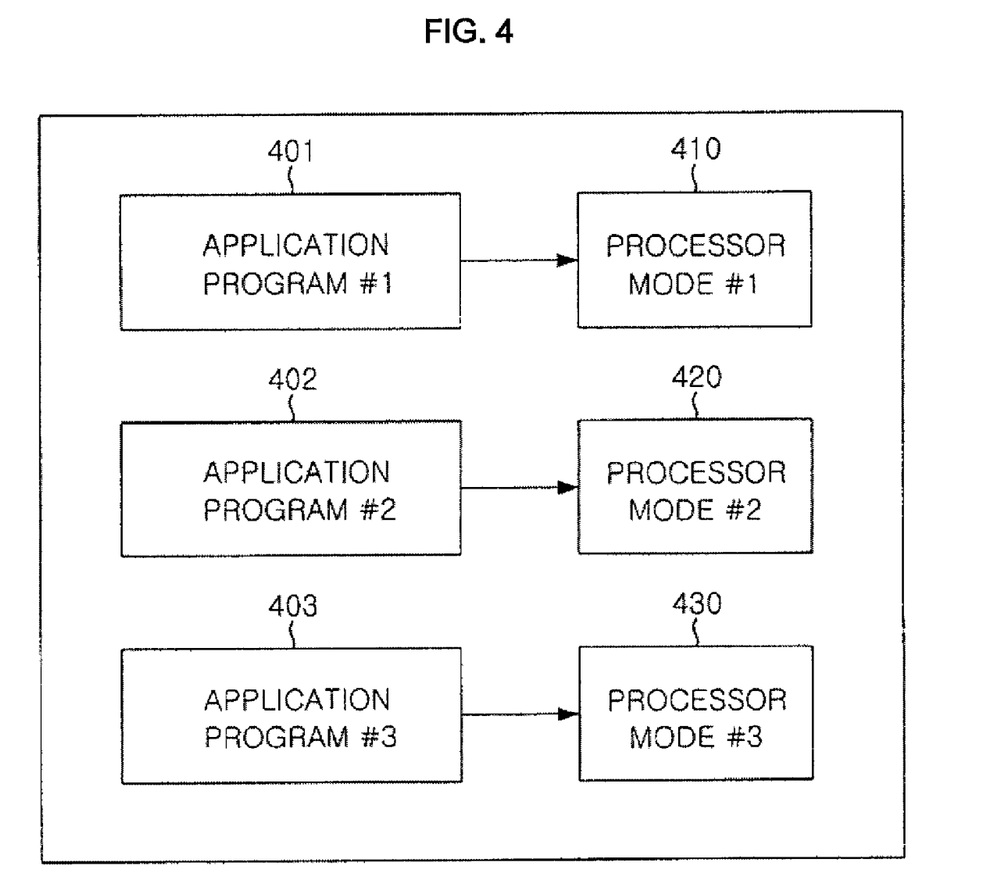
FIG. 4 is a flowchart of an automatic power-mode control process for a multi-core processor which monitors application programs.

Referring to FIG. 4, in order to control the processor mode through monitoring for application programs, each processor mode corresponding to each application program is stored. The monitoring unit determines if each application program is executed. If the execution of a predetermined or registered application program is sensed by the monitoring unit, the processor mode is changed from an original operation mode to a predetermined mode corresponding to the predetermined application program. If the execution of the predetermined application program ends, the processor mode returns to the original operation mode.

A memory device of a computer system stores information relating to the power mode of the processor in connection with the operation of each application program. For example, as the user of the computer system executes an application program (such as a CAD program) using the processor at a higher rate, the processor mode is set to a mode (e.g., mode #3) to operate more cores. In contrast, if the user executes an application program such as a simple word processing program, the processor mode is set to a mode (e.g., mode #1) to operate only one or a few cores.

If the processor mode is controlled through monitoring application programs as described above, it may be beneficial to limit the monitoring of the application programs executed in the computer system. For example, specific application programs may be registered in a predetermined storage, e.g., a system registry, and only registered application programs may be monitored when the associated application program is executed. Further, if an executed application program is a registered application program, the mode change unit may determine if the processor mode should be changed. If multiple registered application programs are executed at the same time, the highest power mode of selectable multi-core operation modes is selected.

Figure 5:
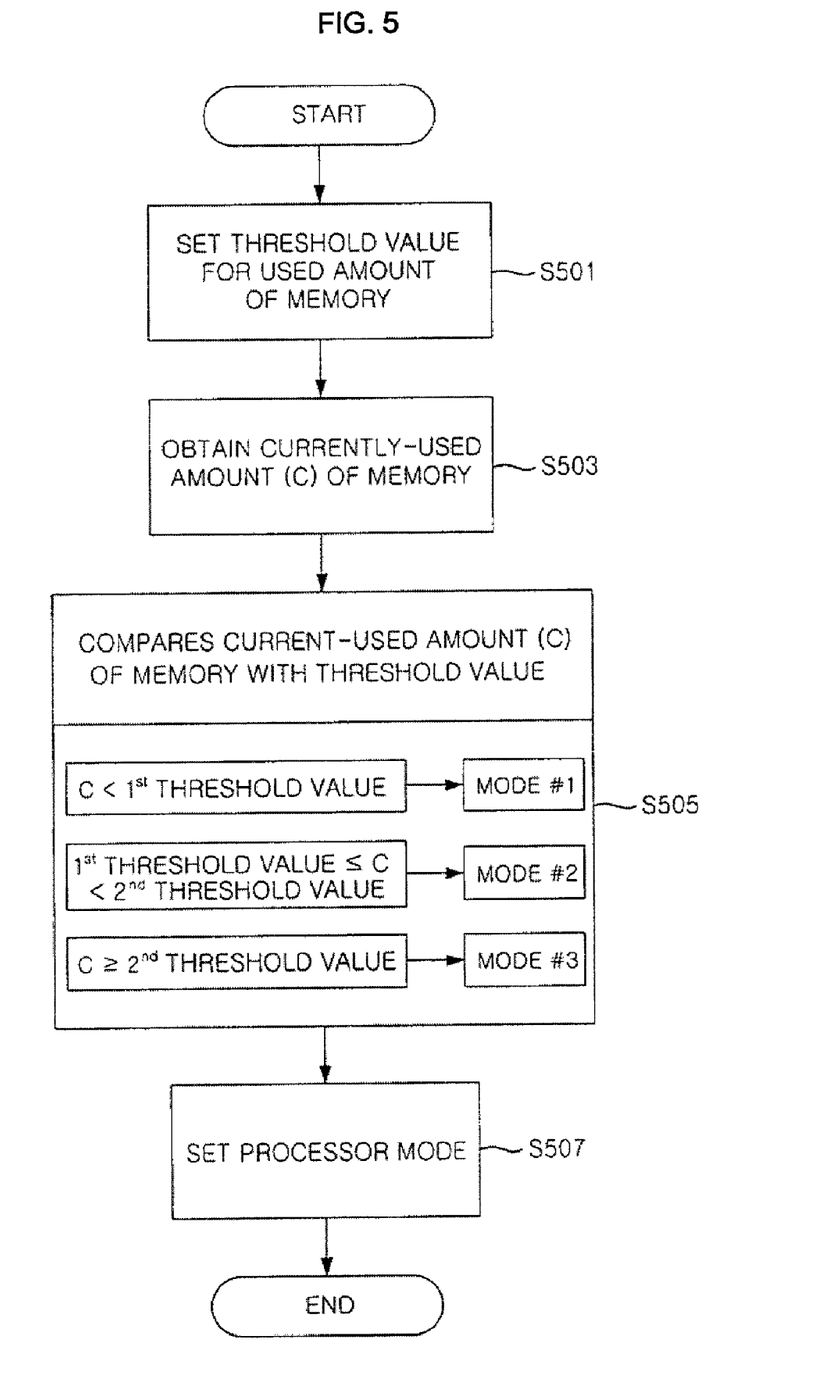
FIG. 5 is a flowchart of an automatic power-mode control process for a multi-core processor based on the amount of available memory.

Referring to FIG. 5, an exemplary process for automatically controlling a processor mode of a multi-core processor is based upon an assessment of an amount of available memory. The amount of memory available during a predetermined period of time is periodically monitored, and the operation mode of the processor is changed to a predetermined mode based on the amount of memory available. The amount of memory available is determined based upon available free memory and/or based on the level or number of read and write accesses to the memory (e.g., a number of accesses in excess of a predetermined number). In order to control the processor mode based on the amount of memory, threshold values for the amount of memory are set, and the interrelation between the amount of memory being used and corresponding processor modes are stored in a memory.

Referring to FIG. 5, threshold values for the used amount of memory are set in order to control the processor mode of a multi-core processor (501). These threshold values may be changed depending on the computer system, and may be set to different values by the user. If a multi-core processor includes N cores, N−1 threshold values are set since N modes are available.

In order to control the processor mode based on the amount of memory being used, the currently-used amount (C) of memory in the system is obtained (503). Information about the currently-used amount (C) of memory may be obtained from the operating system of the computer system. After the currently-used amount (C) of memory has been obtained, it is determined which one of pre-set threshold-value ranges includes the currently-used amount (C) of memory (505), and the processor mode is changed to the mode corresponding to that range (507).

For instance, when the multi-core processor includes three cores, three modes are available, and two threshold values are set. The two threshold values include a first threshold value and a higher second threshold value set based on the amount of memory being used. In the case in which the first threshold value is smaller than the second threshold value, when the currently-used amount of the memory is less than the first threshold value, the processor mode is set to a mode to operate only one core. If the currently-used amount of the memory is both equal to or greater than the first threshold value and less than the second threshold value, the processor mode is set to a mode to operate two cores. If the currently-used amount of the memory is more than the second threshold value, the processor mode is set to a mode to operate all three cores.

The method for controlling the power of a multi-core processor can also be embodied in a computer-readable recording medium. A program for realizing the automatic control method for the processor mode of a multi-core processor may be stored in a hard disk drive of a computer system, and may be loaded for execution after an operating system is booted. The computer-readable recording medium may include one or more of a ROM, an EEPROM, a flash EEPROM, a floppy disk, a CD-ROM, and/or an optical data recording medium.

The computer-readable recording medium stores computer-executable program codes for performing the automatic power-mode control method for a multi-core processor, including monitoring the power mode of a system, an AC power status, the remaining power of the battery, the used amount or available amount of memory, an operation associated with an application program, and/or the recognition of a type of application program, and setting the power mode of the system either to a multi-core mode or to a single-core mode based on a monitoring result.

As described above, a usage environment of a computer system having a multi-core processor including at least two cores is monitored, and the processor mode is changed so as to be suitable for the monitored usage environment in real time. This approach reduces power consumption while maintaining a high level of performance of the computer system. In addition, the processor mode may be changed manually or automatically, in real time, without requiring a restart of the system, thereby improving the operating experience of the user.

Various modifications, additions and substitutions are possible. Accordingly, other implementations are within the scope of the following claims.

What is claimed is:

1. An apparatus for controlling a power management mode of a multi-core processor in a computer system, the apparatus comprising:
   a monitoring unit configured to monitor conditions relating to the power management mode of the multi-core processor; and
   an automatic mode change unit operatively connected to the monitoring unit for receiving the monitored conditions, wherein the automatic mode change unit is configured for setting the power management mode of the multi-core processor to a single-core mode or a multi-core mode based on the monitored conditions and is configured to set the power management mode to the single-core mode if an amount of memory usage is equal to or less than a predetermined threshold value, and is configured to set the power management mode to the multi-core mode if the amount of memory usage exceeds the predetermined threshold value, wherein the amount of memory usage is determined by at least one of an available free memory and a level or number of read and write accesses to the memory, and wherein the memory is loaded with an operating system.

2. The apparatus as claimed in claim 1, wherein the monitored conditions include at least one condition selected from the group consisting of the power mode of the computer system, an AC power status, a remaining battery level, and available memory.

3. The apparatus as claimed in claim 1, wherein the monitored conditions include an activity relating to an operation of an application program.

4. The apparatus as claimed in claim 1, wherein the automatic mode change unit is configured to set the power management mode to the single-core mode for a power saving mode, and is configured to set the power management mode to the multi-core mode for a full performance mode.

5. The apparatus as claimed in claim 1, wherein the automatic mode change unit is configured to set a power management mode to the single-core mode if an AC power status of the computer system is in a battery mode, and is configured to set the power management mode to the multi-core mode if the AC power status of the computer system is in an AC adapter mode.

6. The apparatus as claimed in claim 1, wherein the automatic mode change unit is configured to set the power management mode to the single-core mode if a remaining power of a battery is equal to or less than a predetermined threshold value, and is configured to set the power management mode to the multi-core mode when the remaining power of the battery exceeds the predetermined threshold value.

7. The apparatus as claimed in claim 1, wherein the automatic mode change unit is configured to set the power management mode based upon a detection of an activity relating to an application program, wherein the application program and a corresponding power management mode are registered in a memory device.

8. The apparatus as claimed in claim 1, wherein the automatic mode change unit is configured to set the power management mode based upon an additional monitored condition if the power mode is in an automatic mode.

9. The apparatus as claimed in claim 7, wherein the additional monitored condition includes at least one condition selected from the group consisting of an AC power status, a remaining battery level, available memory, and an activity relating to an operation of an application program.

10. A computer system comprising:
a multi-core processor;
an operating system; and
a power management mode control apparatus operatively connected to the operating system and the multi-core processor, wherein the power management mode control apparatus is configured to control a power management mode of the multi-core processor, and the power management mode control apparatus includes:
a monitoring unit configured to monitor conditions relating to the power management mode of the multi-core processor, and
an automatic mode change unit operatively connected to the monitoring unit to receive the monitored conditions, wherein the automatic mode change unit is configured to set the power management mode of the multi-core processor to a single-core mode or a multi-core mode based on the monitored conditions and is configured to set the power management mode to the single-core mode if an amount of memory usage is equal to or less than a predetermined threshold value, and is configured to set the power management mode to the multi-core mode if the amount of memory usage exceeds the predetermined threshold value, wherein the amount of memory usage is determined by at least one of an available free memory and a level or number of read and write accesses to the memory, and wherein the memory is loaded with an operating system.

11. A method for controlling a power management mode of a multi-core processor, the method comprising:
monitoring conditions relating to the power management mode of the multi-core processor; and
setting the power management mode to a single-core mode if an amount of memory usage is equal to or less than a predetermined threshold value and setting the power management mode to a multi-core mode if the amount of memory usage exceeds the predetermined threshold value, wherein the amount of memory usage is determined by at least one of an available free memory and a level or number of read and write accesses to the memory, and wherein the memory is loaded with an operating system.

12. The method as claimed in claim 11, wherein the monitored conditions include at least one condition selected from the group consisting of the power mode of the computer system, an AC power status, a remaining battery level, and available memory.

13. The method as claimed in claim 11, wherein the monitored conditions include an activity relating to an operation of an application program.

14. A computer-readable recording medium storing a computer-executable program code therein to cause a computer to perform a method for controlling a power management mode of a multi-core processor, the method comprising:
monitoring conditions relating to the power management mode of the multi-core processor; and
setting the power management mode to a single-core mode if an amount of memory usage is equal to or less than a predetermined threshold value and setting the power management mode to a multi-core mode if the amount of memory usage exceeds the predetermined threshold value, wherein the amount of memory usage is determined by at least one of an available free memory and a level or number of read and write accesses to the memory, and wherein the memory is loaded with an operating system.

15. The computer readable recording medium as claimed in claim 14, wherein the monitored conditions include at least one condition selected from the group consisting of the power mode of the computer system, an AC power status, a remaining battery level, and available memory.

16. The computer readable recording medium as claimed in claim 15, wherein the monitored conditions include an activity relating to an operation of an application program.

* * * * *

UNITED STATES PATENT AND TRADEMARK OFFICE
CERTIFICATE OF CORRECTION

PATENT NO.        : 7,596,705 B2                                        Page 1 of 1
APPLICATION NO.   : 11/424080
DATED             : September 29, 2009
INVENTOR(S)       : Seo Kwang Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 605 days.

Signed and Sealed this

Twenty-eighth Day of September, 2010

David J. Kappos
*Director of the United States Patent and Trademark Office*